(12) United States Patent
Shin et al.

(10) Patent No.: US 9,608,244 B2
(45) Date of Patent: Mar. 28, 2017

(54) BATTERY MODULE HAVING NOVEL STRUCTURE

(71) Applicant: LG CHEM, LTD., Seoul (KR)

(72) Inventors: Yong Shik Shin, Daejeon (KR); Jong Moon Yoon, Daejeon (KR); JaeHun Yang, Daejeon (KR); Jin Kyu Lee, Daejeon (KR); BumHyun Lee, Seoul (KR); DalMo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 130 days.

(21) Appl. No.: 13/656,317

(22) Filed: Oct. 19, 2012

(65) Prior Publication Data

US 2013/0045403 A1 Feb. 21, 2013

Related U.S. Application Data

(63) Continuation of application No. PCT/KR2011/004033, filed on Jun. 2, 2011.

(30) Foreign Application Priority Data

Jun. 3, 2010 (KR) .................. 10-2010-0052122

(51) Int. Cl.
*H01M 2/10* (2006.01)
*H01M 10/48* (2006.01)
(Continued)

(52) U.S. Cl.
CPC ......... *H01M 2/1077* (2013.01); *H01M 2/206* (2013.01); *H01M 2/0207* (2013.01);
(Continued)

(58) Field of Classification Search
None
See application file for complete search history.

(56) References Cited

U.S. PATENT DOCUMENTS 4,473,264 A * 9/1984 Julian .................. H01M 2/206
29/623.1
6,368,743 B1 * 4/2002 Guerin ............... B60G 21/0553
429/159

(Continued)

OTHER PUBLICATIONS

International Search Report issued PCT/KR2011/004033, mailed on Dec. 22, 2011.

*Primary Examiner* — Barbara Gilliam
*Assistant Examiner* — Adam A Arciero
(74) *Attorney, Agent, or Firm* — Birch, Stewart, Kolasch & Birch, LLP

(57) ABSTRACT

Disclosed herein is a battery module including (a) a battery cell stack including two or more battery cells or unit modules electrically connected to each other in a state in which the battery cells or unit modules are vertically stacked, (b) a first housing to cover the entirety of the end of one side of the battery cell stack and portions of the top and bottom of the battery cell stack and (c) a second housing to cover the entirety of the end of the other side of the battery cell stack and the remainder of the top and bottom of the battery cell stack, wherein the first housing and the second housing are provided with coupling holes formed to couple the first housing and the second housing to each other, the coupling holes being horizontal coupling holes, through which coupling members can be inserted in the lateral direction.

15 Claims, 8 Drawing Sheets

(51) Int. Cl.
  *H01M 2/20* (2006.01)
  *H01M 2/02* (2006.01)
  *H01M 10/625* (2014.01)
  *H01M 10/647* (2014.01)
  *H01M 10/613* (2014.01)
  *H01M 10/656* (2014.01)

(52) U.S. Cl.
  CPC ........ *H01M 10/482* (2013.01); *H01M 10/486* (2013.01); *H01M 10/613* (2015.04); *H01M 10/625* (2015.04); *H01M 10/647* (2015.04); *H01M 10/656* (2015.04); *H01M 2220/20* (2013.01)

(56) References Cited

U.S. PATENT DOCUMENTS

| | | | |
|---|---|---|---|
| 6,379,837 B1* | 4/2002 | Takahashi et al. | 429/151 |
| 2008/0248377 A1* | 10/2008 | Hashida | 429/99 |
| 2009/0220853 A1* | 9/2009 | Yang et al. | 429/159 |
| 2009/0305116 A1 | 12/2009 | Yang et al. | |
| 2009/0320715 A1* | 12/2009 | Morita | B60K 1/04 105/51 |
| 2010/0021802 A1 | 1/2010 | Yang et al. | |
| 2010/0273042 A1* | 10/2010 | Buck | H01M 2/024 429/120 |

* cited by examiner

BATTERY MODULE HAVING NOVEL STRUCTURE

CROSS REFERENCE TO RELATED APPLICATIONS

This application is a Continuation of PCT International Application No. PCT/KR2011/004033 filed on Jun. 2, 2011, which claims priority under 35 U.S.C. §119(a) to Patent Application No. 10-2010-0052122 filed in the Republic of Korea on Jun. 3, 2010, all of which are hereby expressly incorporated by reference into the present application.

TECHNICAL FIELD

The present invention relates to a battery module having a novel structure, and, more particularly, to a battery module including (a) a battery cell stack including two or more battery cells or unit modules electrically connected to each other in a state in which the battery cells or unit modules are vertically stacked, (b) a first housing to cover the entirety of the end of one side of the battery cell stack and portions of the top and bottom of the battery cell stack and (c) a second housing to cover the entirety of the end of the other side of the battery cell stack and the remainder of the top and bottom of the battery cell stack, wherein the first housing and the second housing are provided with coupling holes formed to couple the first housing and the second housing to each other, the coupling holes being horizontal coupling holes, through which coupling members can be inserted in the lateral direction.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV) and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery module having a plurality of battery cells electrically connected to one another because high power and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell of a middle or large-sized battery module. In particular, much interest is currently focused on the pouch-shaped battery, which uses an aluminum laminate sheet as a sheathing member, because the pouch-shaped battery is lightweight and the manufacturing costs of the pouch-shaped battery are low.

Meanwhile, a conventional battery cell is configured to have a structure in which battery cells are arranged in the lateral direction to constitute a battery cell stack, the battery cell stack is mounted in a lower case, and an upper case is coupled to the lower case. Consequently, it is possible to increase the size of the battery cell stack in the lateral direction. However, it is not possible to increase the height of the battery cell stack.

Also, the tooling direction in which the upper case is coupled to the lower case after the battery cell stack is mounted in the lower case is formed from top to bottom with the result that it is not possible to arrange battery modules in the longitudinal direction since it is difficult to approach the battery modules.

Consequently, there is a high necessity for battery module configured to have a structure in which battery cells are vertically stacked to constitute a battery module, the number of the battery cells is adjusted based on the installation height of the battery module, whereby it is possible to flexibly constitute the battery module, and the tooling direction in which the upper case is coupled to the lower case is changed so that battery modules can be arranged in the longitudinal direction.

DISCLOSURE OF INVENTION

Technical Problem

Therefore, the present invention has been made to solve the above problems, and other technical problems that have yet to be resolved.

Specifically, it is an object of the present invention to provide a battery module in which the height of a battery cell stack is flexibly changeable based on the installation height of the battery module so that a plurality of battery modules can be arranged in the longitudinal direction based on desired capacity and power of a battery pack.

Technical Solution

In accordance with one aspect of the present invention, the above and other objects can be accomplished by the provision of a battery module including (a) a battery cell stack including two or more battery cells or unit modules electrically connected to each other in a state in which the battery cells or unit modules are vertically stacked, (b) a first housing to cover the entirety of the end of one side of the battery cell stack and portions of the top and bottom of the battery cell stack and (c) a second housing to cover the entirety of the end of the other side of the battery cell stack and the remainder of the top and bottom of the battery cell stack, wherein the first housing and the second housing are provided with coupling holes formed to couple the first housing and the second housing to each other, the coupling holes being horizontal coupling holes, through which coupling members can be inserted in the lateral direction.

In the battery module according to the present invention, a tooling operation can be performed in the horizontal direction since the coupling holes are horizontal coupling holes, through which the coupling members can be inserted in the lateral direction, and therefore, it is possible to easily solve troubles in approach based on the tooling direction.

Also, since the battery cells or the unit modules are vertically stacked, it is possible to variably adjust the total height of the battery module depending upon the volume of a device in which the battery module is installed. In addition, since a coolant can flow in spaces defined between the battery cells or the unit modules, it is possible to arrange battery modules in the longitudinal direction, and therefore, it is possible to configure a compact cooling flow space.

The battery module is manufactured as follows. For example, at least some of the electrical connection portions of the battery cells are connected in series to each other in the unit module or at least some of the electrical connection portions of the battery cells in one unit module are connected in series to at least some of the electrical connection portions of the battery cells in another unit module. The electrode terminals of the battery cells are coupled to each other in a state in which the battery cells are arranged so that the electrode terminals of the battery cells are adjacent to each other, and a predetermined number of the battery cells are covered by cell covers to manufacture a plurality of unit modules. A sequence of the manufacturing process may be partially changed. For example, a plurality of unit modules may be individually manufactured and electrical connection between the unit modules may be performed.

The battery cell stack, in which the battery cells are stacked with high integration in a state in which the electrode terminals are connected to each other, is mounted in the first and second housings, which can be separated from side to side and are coupled to each other in an assembly type coupling structure, in the horizontal direction. Consequently, the battery cell stack is mounted in the first and second housings, and then the first and second housings are coupled to each other.

Preferably, the horizontal coupling holes are formed at positions of the first housing and the second housing corresponding to the front and rear of the battery module, respectively. Consequently, it is possible to successively insert the coupling members into the horizontal coupling holes of the first housing and the second housing from the front to the rear of the battery module, thereby easily achieving coupling between the first housing and the second housing.

The first housing and/or the second housing may be provided with coupling holes formed to install the battery module in a predetermined space or on a predetermined device. The coupling holes may be vertical coupling holes, through which coupling members can be inserted from above.

Consequently, the coupling members are inserted into the vertical coupling holes of the first housing and/or the second housing from above, and therefore, it is possible to easily install the battery module in a device, such as a vehicle.

In a concrete example, the vertical coupling holes may be spaced a predetermined distance from the bottom of the first housing and the second housing in a state in which the vertical coupling holes protrude from the front and rear of the first housing and the second housing.

Also, the positions of the vertical may be changed depending upon the shape or position of a space in which the battery module is installed. The space may be a space defined below a car frame, a space defined below a car seat or a space defined between wheels.

Each of the battery cells may be a plate-shaped battery cell having electrode terminals formed at the upper end and the lower end thereof, respectively.

In a preferred example, the battery cell stack may include two or more unit modules, each of which includes plate-shaped battery cells, each of which has electrode terminals formed at the upper end and the lower end thereof, respectively, and each of the unit modules may include two or more battery cells in which electrode terminals are connected in series and in parallel to each other and a pair of high-strength cell covers coupled to each other so as to cover the entirety of the outside of the battery cells excluding the electrode terminals of the battery cells.

In another example, the battery cell stack may be configured to have a structure in which the battery cells are connected in series and in parallel to each other.

In the above structure, the parallel connection may be a structure in which the electrode terminals of the battery cells are directly connected to each other and the series connection may be a structure in which the electrode terminals of the battery cells are connected to each other via bus bars.

In a concrete example, the direct connection between the electrode terminals in the parallel connection may be achieved by ultrasonic welding.

Meanwhile, the first housing or the second housing may be provided with a pair of external input and output terminals.

In the above structure, bus bars for external input and output terminal connection, which are configured to be connected to the external input and output terminals, may be provided at the electrode terminals of the outermost battery cells of the battery cell stack.

In a concrete example, each of the bus bars for external input and output terminal connection may include an electrode terminal connection part electrically connected to a corresponding one of the outermost electrode terminals of the battery cell stack and an input and output terminal connection part connected to a corresponding one of the external input and output terminals of the first housing or the second housing. Each of the input and output terminal connection parts may extend from a corresponding one of the electrode terminal connection parts in the lateral direction.

In an example of the above structure, the external input and output terminals may be formed at the first housing or the second housing in an upwardly protruding structure, each of the input and output terminal connection parts may be formed in an inwardly depressed structure, and each of the external input and output terminals may be fitted in the depression of a corresponding one of the input and output terminal connection parts, thereby achieving electrical connection between the bus bars for external input and output terminal connection and the external input and output terminals.

In another example, the external input and output terminals may include a first external input and output terminal mounted at the upper part of one side of the second housing and a second external input and output terminal mounted at the lower part of the other side of the second housing, and the bus bars for external input and output terminal connection may include a first bus bar connected to the electrode terminal of the battery cell located at the upper end of the battery cell stack so that the first bus bar can be connected to the first external input and output terminal and a second bus bar connected to the electrode terminal of the battery cell located at the lower end of the battery cell stack so that the second bus bar can be connected to the second external input and output terminal.

In a concrete example, the second bus bar may have a greater length than the first bus bar.

Meanwhile, the battery module according to the present invention may further include a sensing member which comprises sensors mounted in spaces defined at the front and rear of the second housing and a conduction part to connect the sensors to each other.

A plurality of mounting grooves, into which the edges of the battery cells or the unit modules will be inserted, may be formed at the inside of each of the first and second housings.

Meanwhile, the battery module according to the present invention is configured generally in a compact structure. Also, structurally stable mechanical coupling and electrical connection are achieved without using a large number of members. In addition, a predetermined number, such as 4, 6, 8 or 10, of battery cells or unit modules constitute a battery module. Consequently, it is possible to effectively install a necessary number of battery modules in a limited space.

In accordance with another aspect of the present invention, therefore, there is provided a high power and capacity middle or large-sized battery pack manufactured using the battery module with the above-stated construction as a unit module.

In a preferred example, the battery modules of the middle or large-sized battery pack may be arranged in the lateral direction and/or in the rearward direction, and external input and output terminals of the battery modules may be electrically connected to each other via cables.

Meanwhile, each of the battery modules may include a voltage sensing member and a temperature sensor for each of the battery modules. Consequently, it is possible to sense and control excessive increase of voltage and temperature, thereby effectively preventing the battery modules from catching fire or exploding.

The temperature sensor for each of the battery modules may be, for example, a thermistor. The upper end of the temperature sensor for each of the battery modules may protrude to the left side of a through hole of the first housing or to the right side of a through hole of the second housing.

Consequently, it is possible to selectively dispose the temperature sensor for each of the battery modules in the through hole of the first housing or the second housing depending upon the position at which the battery module is installed in a vehicle.

Also, in the structure of the battery pack, the voltage sensing members and the temperature sensors for battery modules may be connected to a battery management system (BMS) via a wiring harness. Consequently, it is possible to easily control the battery pack based on voltage detection values transmitted from the voltage sensing members and temperature detection values transmitted from the temperature sensors for the battery modules.

The middle or large-sized battery pack according to the present invention may be manufactured by combining battery modules based on desired power and capacity. Also, the middle or large-sized battery pack according to the present invention is preferably used as a power source for electric vehicles, hybrid electric vehicles or plug-in hybrid electric vehicles, which have a limited installation space and are exposed to frequent vibration and strong impact in consideration of installation efficiency and structural stability as previously described.

BRIEF DESCRIPTION OF DRAWINGS

The above and other objects, features and other advantages of the present invention will be more clearly understood from the following detailed description taken in conjunction with the accompanying drawings, in which.

MODE FOR THE INVENTION

Now, preferred embodiments of the present invention will be described in detail with reference to the accompanying drawings. It should be noted, however, that the scope of the present invention is not limited by the illustrated embodiments.

Figure 1:
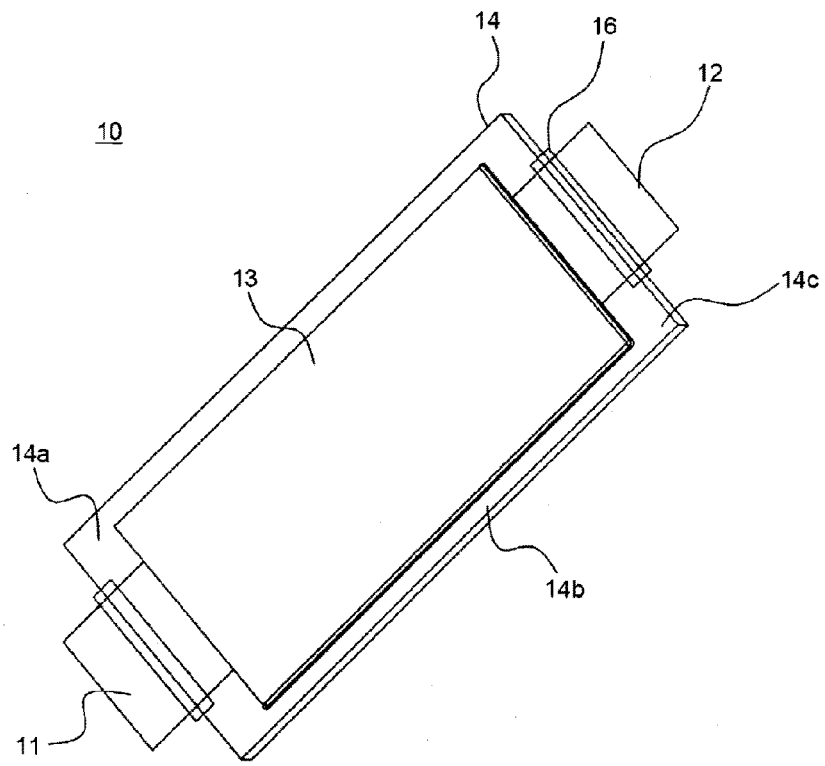
FIG. 1 is a perspective view of a plate-shaped battery cell, which will be mounted in a battery module.

FIG. 1 is a perspective view typically illustrating an exemplary plate-shaped battery cell, which will be mounted in a battery module according to the present invention.

Referring to FIG. 1, a plate-shaped battery cell 10 is configured to have a structure in which two electrode leads 11 and 12 protrude from the upper end and the lower end of a battery body 13, respectively, so that the electrode leads 11 and 12 are opposite to each other. A sheathing member 14 includes upper and lower sheathing parts. That is, the sheathing member 14 is a two-unit member. An electrode assembly (not shown) is mounted in a receiving part which is defined between the upper and lower sheathing parts of the sheathing member 14. Opposite sides 14b, an upper end 14a and a lower end 14c, which are contact regions of the upper and lower sheathing parts of the sheathing member 14, are bonded to each other, whereby the battery cell 10 is manufactured. The sheathing member 14 is configured to have a laminate structure of a resin layer/a metal film layer/a resin layer. Consequently, it is possible to bond the opposite sides 14b and the upper and lower ends 14a and 14c of the upper and lower sheathing parts of the sheathing member 14, which are in contact with each other, to each other by applying heat and pressure to the opposite sides 14b and the upper and lower ends 14a and 14c of the upper and lower sheathing parts of the sheathing member 14 so as to weld the resin layers thereof to each other. According to circumstances, the opposite sides 14b and the upper and lower ends 14a and 14c of the upper and lower sheathing parts of the sheathing member 14 may be bonded to each other using a bonding agent. For the opposite sides 14b of the sheathing member 14, the same resin layers of the upper and lower sheathing parts of the sheathing member 14 are in direct contact with each other, whereby uniform sealing at the opposite sides 14b of the sheathing member 14 is accomplished by welding. For the upper end 14a and the lower end 14c of the sheathing member 14, on the other hand, the electrode leads 11 and 12 protrude from the upper end 14a and the lower end 14c of the sheathing member 14, respectively. For this reason, the upper and lower ends 14a and 14c of the upper and lower sheathing parts of the sheathing member 14 are thermally welded to each other, in a state in which a film type sealing member 16 is interposed between the electrode terminals 11 and 12 and the sheathing member 14, in consideration of the thickness of the electrode leads 11 and 12 and the difference in material between the electrode leads 11 and 12 and the sheathing member 14, so as to increase sealability of the sheathing member 14.

Figure 2:
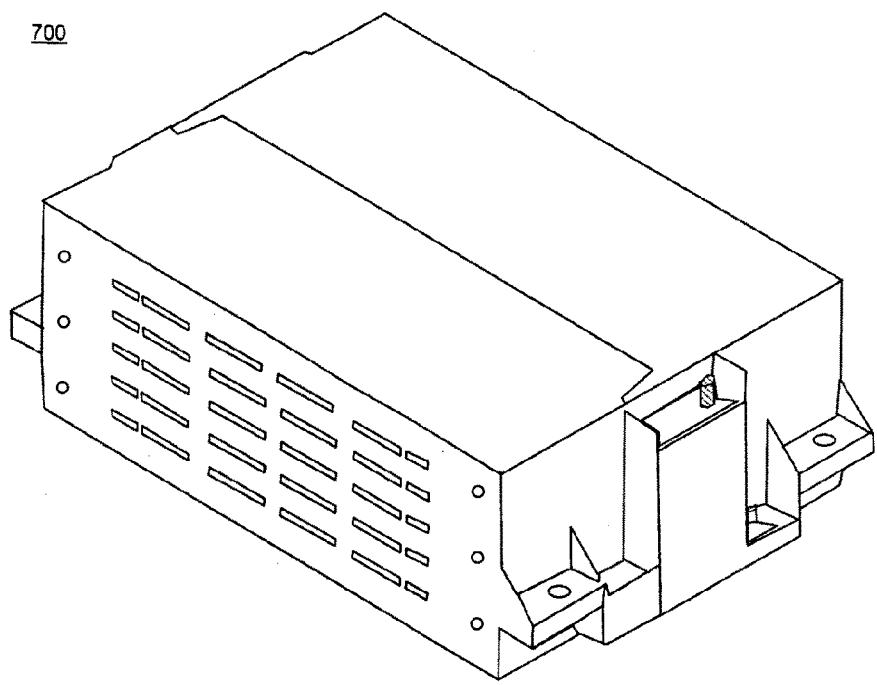
FIG. 2 is a perspective view of a battery module according to an embodiment of the present invention.
Figure 3:
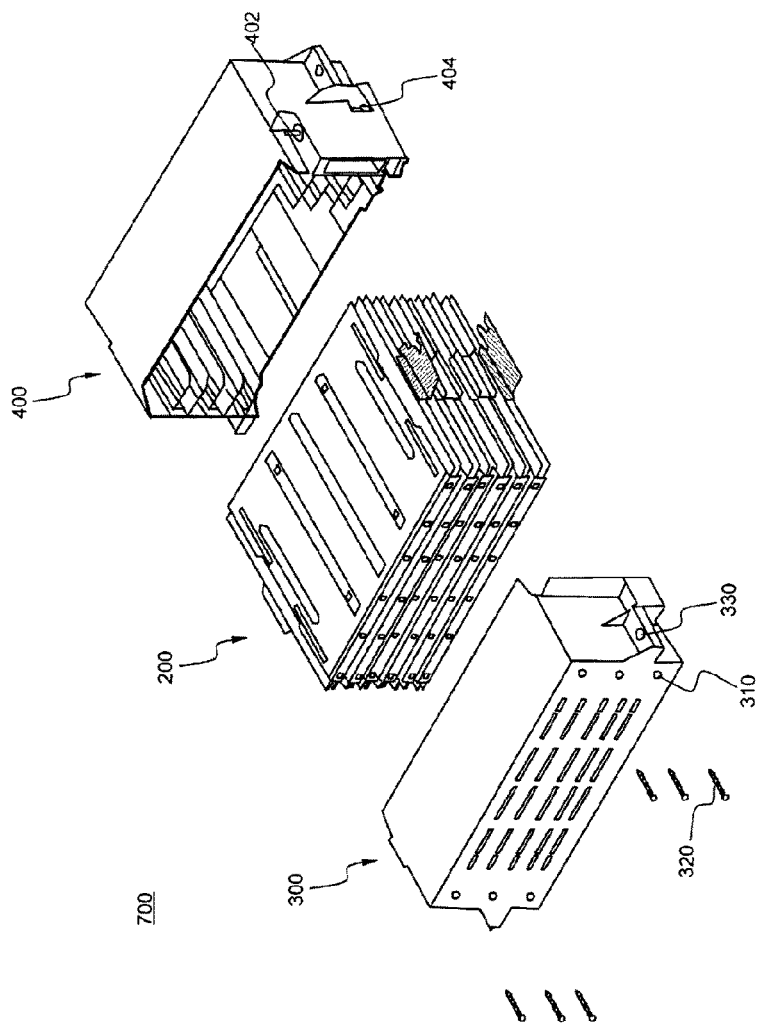
FIG. 3 is an exploded perspective view illustrating the battery module of FIG. 2.
Figure 4:
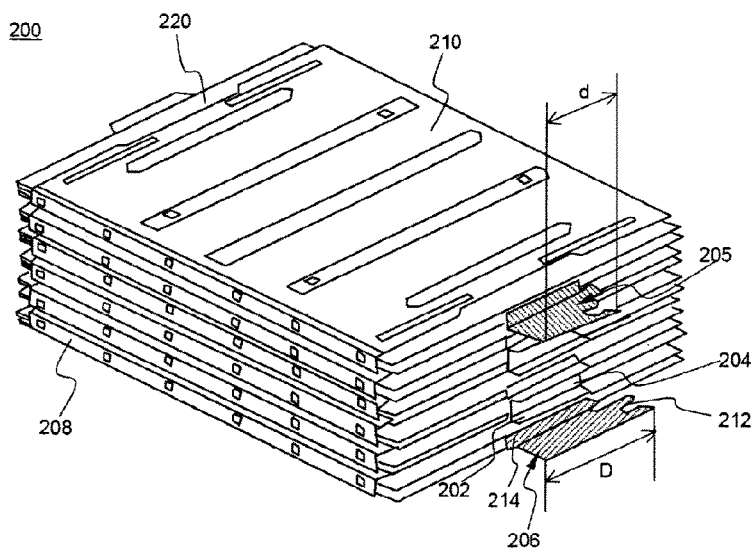
FIG. 4 is an enlarged perspective view illustrating a battery cell stack of the battery module of FIG. 3.

FIG. 2 is a perspective view typically illustrating a battery module according to an embodiment of the present invention, FIG. 3 is an exploded perspective view typically illustrating the battery module of FIG. 2, and FIG. 4 is an enlarged perspective view typically illustrating a battery cell stack of the battery module of FIG. 3.

Referring to these drawings, a battery module 700 includes a battery cell stack 200, a first housing 300 and a second housing 400.

The battery cell stack 200 includes six unit modules 208 electrically connected to each other in a state in which the unit modules 208 are vertically stacked.

The first housing 300 covers the entirety of the end of one side of the battery cell stack 200 and portions of the top and bottom of the battery cell stack 200, and the second housing 400 covers the entirety of the end of the other side of the battery cell stack 200 and the remainder of the top and bottom of the battery cell stack 200.

At the front and the rear of the battery module 700, the first housing 300 and the second housing 400 are provided horizontal coupling holes 310, through which coupling members 320 can be inserted in the lateral direction so as to couple the first housing 300 to the second housing 400.

The first housing 300 and the second housing 400 are provided with vertical coupling holes 330, through which coupling members 320 can be inserted from above so as to install the battery module 700 in a predetermined space or on a predetermined device. Also, a pair of external input and output terminals 402 and 404 is formed at the second housing 400.

Referring to FIG. 4 together with FIG. 3, the battery cell stack 200 includes six unit modules 208. Each of the unit modules 208 includes two plate-shaped battery cells 220, each of which has electrode terminals formed at the upper end and the lower end thereof, respectively.

Specifically, each of the unit modules 208 includes two battery cells 220 in which electrode terminals are connected in series and in parallel to each other and a connection part between the electrode terminals is bent so that the battery cells 200 are arranged in a stacked structure and a pair of high-strength cell covers 210 coupled to each other so as to cover the entirety of the outside of the battery cells 220 excluding the electrode terminals of the battery cells 220.

In the battery cell stack 200, the battery cells 220 are connected in series and in parallel to each other. In the parallel connection, the electrode terminals of the battery cells 220 are directly connected to each other. In the series connection, the electrode terminals of the battery cells 220 are connected to each other via bus bars 202.

Also, bus bars 205 and 206 for external input and output terminal connection, which are configured to be connected to the external input and output terminals 402 and 404 of the second housing 400, are electrically connected to the electrode terminals of the outermost battery cells of the battery cell stack 200.

Each of the bus bars 205 and 206 for external input and output terminal connection includes an electrode terminal connection part 214 electrically connected to a corresponding one of the outermost electrode terminals of the battery cell stack 200 and an input and output terminal connection part 212 connected to a corresponding one of the external input and output terminals 402 and 404 of the second housing 400. Each of the input and output terminal connection parts 212 extends from a corresponding one of the electrode terminal connection parts 214 in the lateral direction.

The external input and output terminals 402 and 404 are formed at the second housing 400 in an upwardly protruding structure. Each of the input and output terminal connection parts 212 is formed in an inwardly depressed structure. Each of the external input and output terminals 402 and 404 is fitted in the depression of a corresponding one of the input and output terminal connection parts 212 with the result that the electrical connection between the bus bars 205 and 206 for external input and output terminal connection and the external input and output terminals 402 and 404 is achieved.

Also, the external input and output terminals 402 and 404 include a first external input and output terminal 402 mounted at the upper part of one side of the second housing 400 and a second external input and output terminal 404 mounted at the lower part of the other side of the second housing 400.

The bus bars for external input and output terminal connection include a first bus bar 205 connected to the electrode terminal of the battery cell located at the upper end of the battery cell stack 200 so that the first bus bar 205 can be connected to the first external input and output terminal 402 and a second bus bar 206 connected to the electrode terminal of the battery cell located at the lower end of the battery cell stack 200 so that the second bus bar 206 can be connected to the second external input and output terminal 404.

The length D of the second bus bar 206 is greater than the length d of the first bus bar 205.

Figure 5:
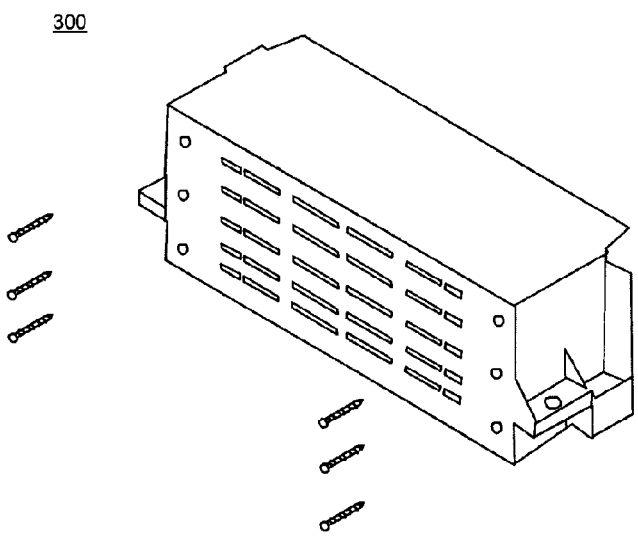
FIG. 5 is an enlarged perspective view illustrating a first housing of the battery module of FIG. 3.
Figure 6:
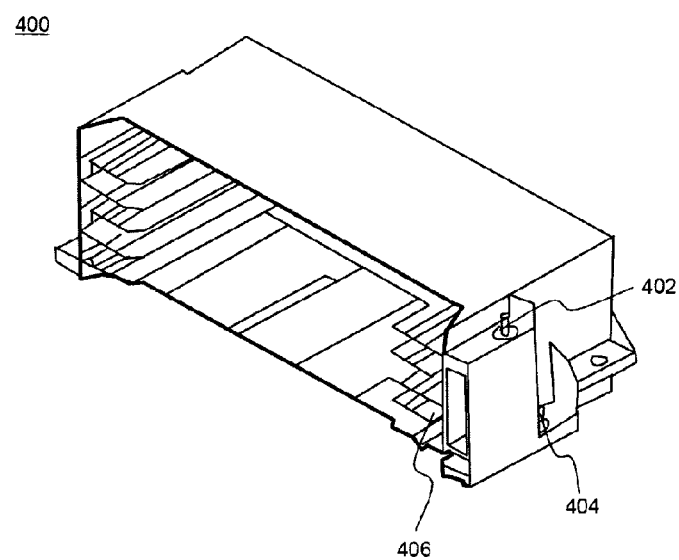
FIG. 6 is an enlarged perspective view illustrating a second housing of the battery module of FIG. 3.

FIG. 5 is an enlarged perspective view typically illustrating the first housing of the battery module of FIG. 3, and FIG. 6 is an enlarged perspective view typically illustrating the second housing of the battery module of FIG. 3.

Referring to these drawings together with FIG. 4, a sensing member (not shown) includes sensors mounted in spaces defined at the front and the rear of the second housing 400, respectively, and a conduction part to connect the sensors to each other.

Also, a plurality of mounting grooves 406, into which the edges of the unit modules 208 will be inserted, are formed at the inside of each of the first and second housings 300 and 400.

Figure 7:
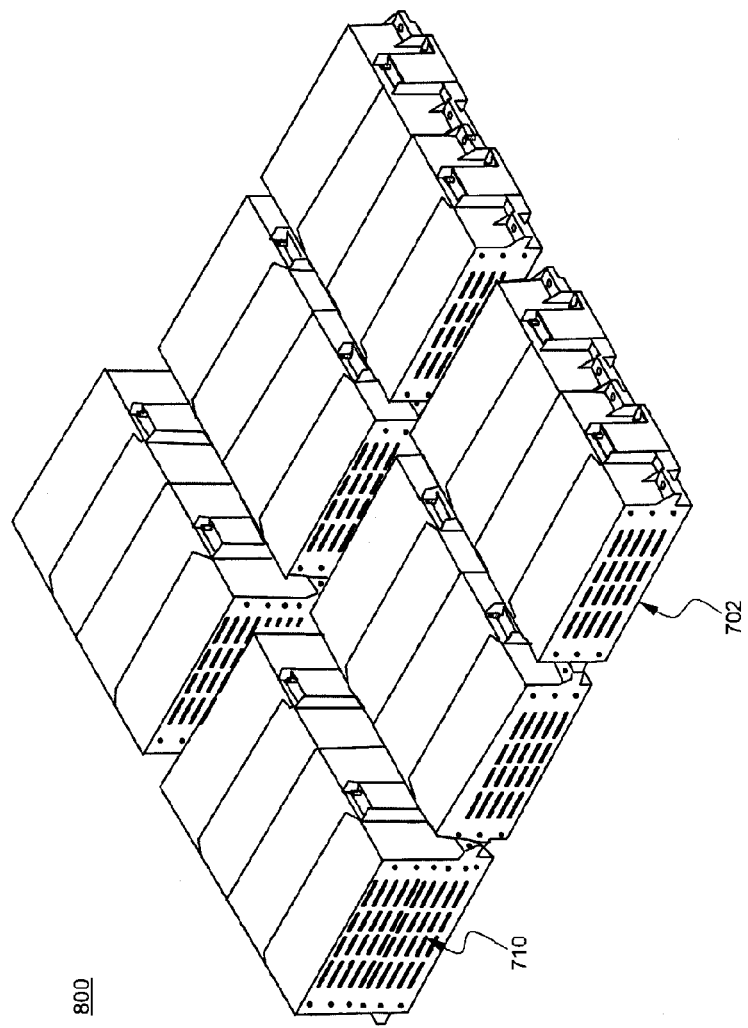
FIGS. 7 and 8 are perspective views of battery packs according to other embodiments of the present invention.
Figure 8:
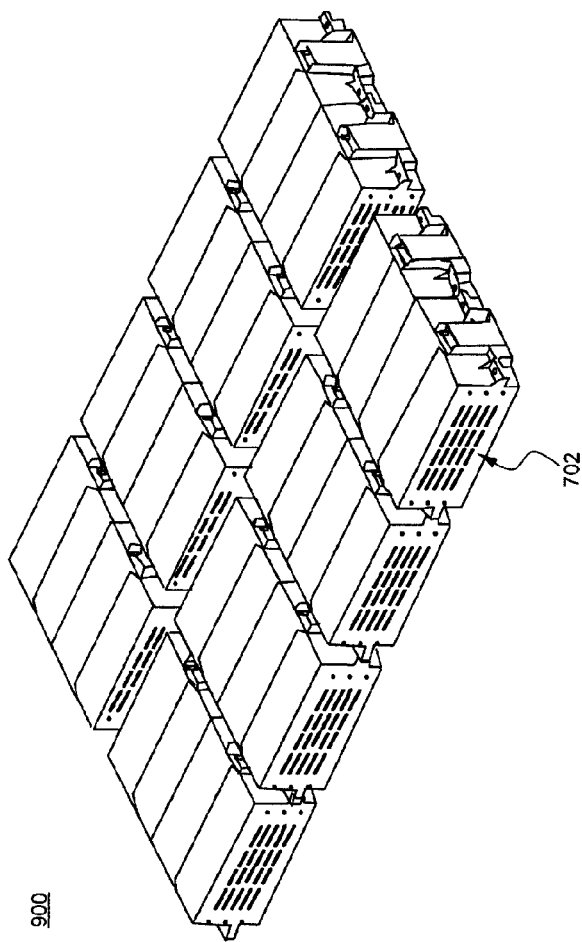

FIGS. 7 and 8 are perspective views of battery packs according to other embodiments of the present invention.

Referring to these drawings, a battery pack 800 of FIG. 7 is configured so that eight battery modules 702, each of which has six unit modules connected in series to each other, and four battery modules 10 each of which has ten unit modules connected in series to each other are arranged in the lateral direction and the rearward direction. Consequently, the battery pack 800 is configured to have a structure 88S in which 88 unit modules are connected in series to each other.

Also, the battery modules 702 and 710 are adjacent to each other two by two to form a pair.

A battery pack 900 of FIG. 8 is configured so that sixteen battery modules 702, each of which has six unit modules connected in series to each other, are arranged in the lateral direction and the rearward direction. Consequently, the battery pack 900 is configured to have a structure 96S in which 96 unit modules are connected in series to each other.

Figure 9:
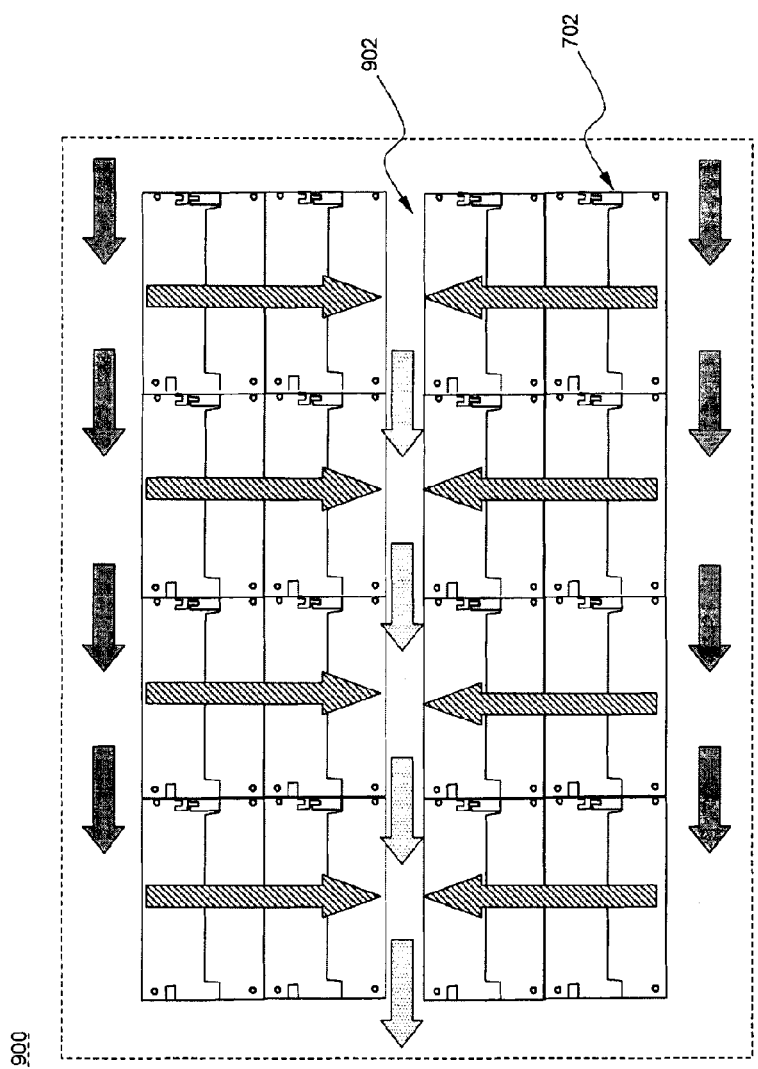
FIG. 9 is a typical plan view illustrating a cooling structure of FIG. 8.

FIG. 9 is a typical plan view illustrating a cooling structure of FIG. 8.

Referring to FIG. 9, a coolant is introduced through the right-side end of the battery pack 900, passes though spaces defined between the unit modules of the battery pack 900 and is discharged through the left-side end of the battery pack 900 via a flow channel 902 formed at the middle of the battery pack 900.

Even when the battery modules 702 are arranged so as to be adjacent to each other two by two, therefore, the coolant passes though the spaces defined between the unit modules of the battery pack 900. Consequently, the cooling structure of the battery pack 900 is compact.

Figure 10:
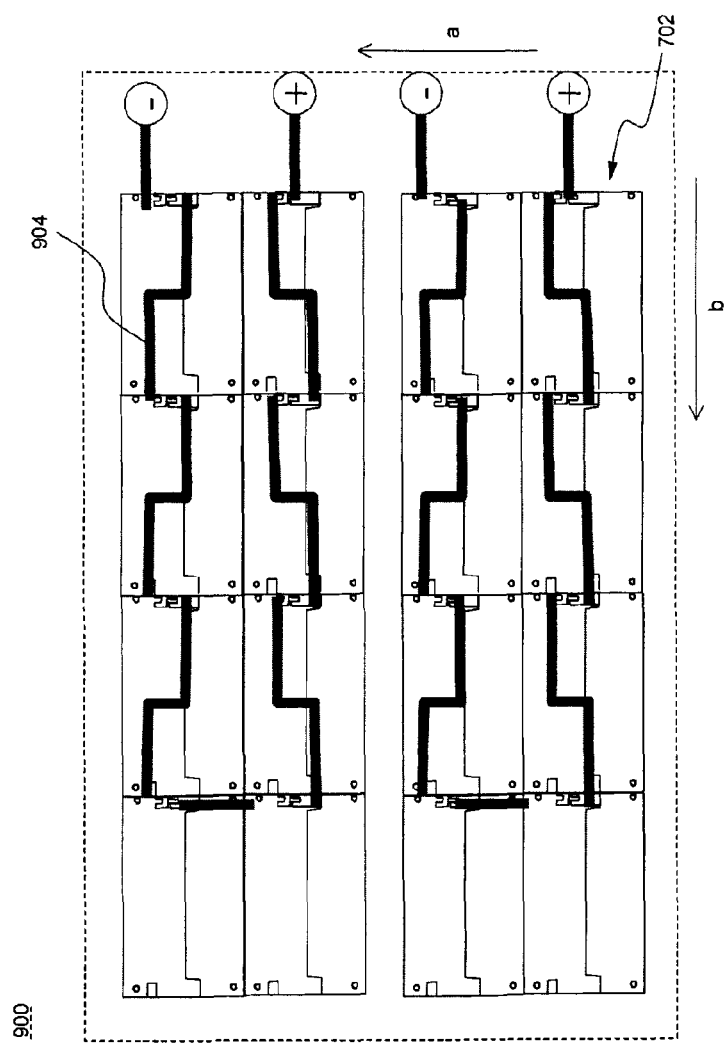
FIG. 10 is a typical plan view illustrating electrical connection of FIG. 8.

FIG. 10 is a typical plan view illustrating electrical connection of FIG. 8.

Referring to FIG. 10, the battery modules 702 of the battery pack 900 are arranged in the lateral direction (a) and in the rearward direction (b), and the external input and output terminals of the battery modules 702 are electrically connected to each other via cables 904.

Figure 11:
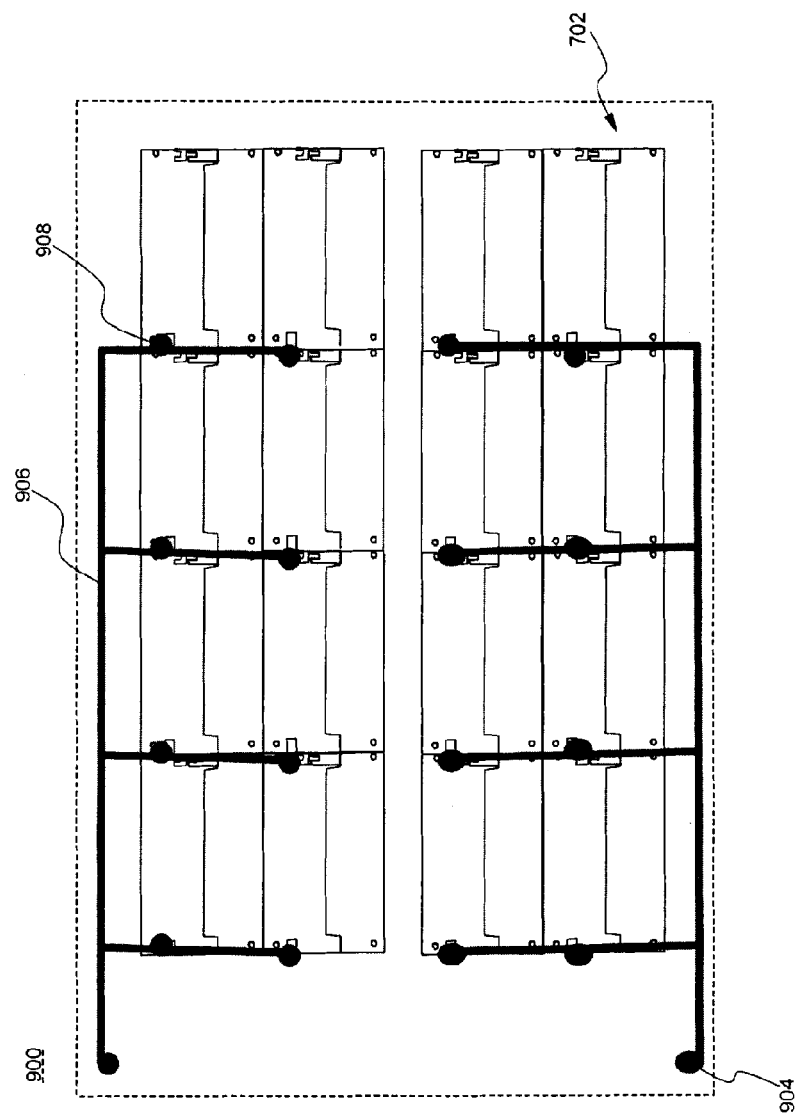
FIG. 11 is a typical plan view illustrating connection of voltage sensing members of FIG. 8.

FIG. 11 is a typical plan view illustrating connection of voltage sensing members of FIG. 8.

Referring to FIG. 11, each of the battery modules 702 includes a voltage sensing member 908. The respective voltage sensing members 908 are connected to a battery management system (BMS) 904 via a wiring harness 906.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured so that the battery cells or the unit modules are vertically stacked, and the horizontal coupling holes are formed at the first housing and the second housing. Consequently, it is possible to flexibly adjust the height of the battery cell stack based on the mounting height of the battery module. Also, it is possible to arrange the battery modules in the longitudinal direction based on desired capacity and power of the battery pack.

The invention claimed is:

1. A battery pack comprising two or more battery modules, in which each of the battery modules comprises:
   (a) a battery cell stack comprising two or more battery cells or unit modules electrically connected to each other in a state in which the battery cells or unit modules are vertically stacked;
   (b) a first housing to cover the entirety of the end of one side of the battery cell stack and portions of the top and bottom of the battery cell stack;
   (c) a second housing to cover the entirety of the end of the other side of the battery cell stack and the remainder of the top and bottom of the battery cell stack; and
   (d) a coolant inlet formed at one side of the battery module and a coolant outlet formed at another side of the battery module opposite of the coolant inlet, whereby a coolant passes through spaces defined between the battery cells or the unit modules of the battery cell stack, wherein
   the first housing and the second housing are provided with coupling holes formed to couple the first housing and the second housing to each other, the coupling holes being horizontal coupling holes, through which coupling members can be inserted in the lateral direction,
   the first housing or the second housing is provided with a pair of external input and output terminals, the external input and output terminals being fouried at the first housing or the second housing in structure protruding parallel to a stacking direction of the battery cell stack,
   the first housing and/or the second housing is provided with coupling holes formed to install the battery module in a predetermined space or on a predetermined device, the coupling holes being vertical coupling holes, through which coupling members can be inserted from above,
   each of the battery cells is a plate-shaped battery cell having electrode terminals formed at the upper end and the lower end thereof, respectively, each plate-shaped battery cell having a first major surface opposite a second major surface and a plurality of minor surfaces extending between the first major surface and the second major surface,
   the top of the battery cell stack being defined by the first major surface of one of the battery cells and the bottom of the battery cell stack being defined by the second major surface of another one of the battery cells,
   the battery modules of the battery pack are arranged in the lateral direction and in the rearward direction,
   at least two adjacent battery modules are separated by a space, whereby the coolant passes through the space between the at least two adjacent battery modules, and
   external input and output terminals of the battery modules are electrically connected to each other via cables.

2. The battery pack according to claim 1, wherein the horizontal coupling holes are formed at positions of the first housing and the second housing corresponding to the front and rear of the battery module, respectively.

3. The battery pack according to claim 1, wherein
   the battery cell stack comprises two or more unit modules, each of which comprises plate-shaped battery cells, each of which has electrode terminals formed at the upper end and the lower end thereof, respectively, and
   each of the unit modules comprises two or more battery cells in which electrode terminals are connected in series and in parallel to each other and a pair of high-strength cell covers coupled to each other so as to cover the entirety of the outside of the battery cells excluding the electrode terminals of the battery cells.

4. The battery pack according to claim 1, wherein the battery cell stack is configured to have a structure in which the battery cells are connected in series and in parallel to each other.

5. The battery pack according to claim 4, wherein the parallel connection is a structure in which the electrode terminals of the battery cells are directly connected to each other, and the series connection is a structure in which the electrode terminals of the battery cells are connected to each other via bus bars.

6. The battery pack according to claim 1, wherein bus bars for external input and output terminal connection, which are configured to be connected to the external input and output terminals, are provided at the electrode terminals of the outermost battery cells of the battery cell stack.

7. The battery pack according to claim 6, wherein each of the bus bars for external input and output terminal connection comprises an electrode terminal connection part electrically connected to a corresponding one of the outermost electrode terminals of the battery cell stack and an input and output terminal connection part connected to a corresponding one of the external input and output terminals of the first housing or the second housing, each of the input and output terminal connection parts extending from a corresponding one of the electrode terminal connection parts in the lateral direction.

8. The battery pack according to claim 7, wherein each of the input and output terminal connection parts is formed in an inwardly depressed structure, and each of the external input and output terminals is fitted in the depression of a corresponding one of the input and output terminal connection parts, thereby achieving electrical connection between the bus bars for external input and output terminal connection and the external input and output terminals.

9. The battery pack according to claim 7, wherein the external input and output terminals comprise a first external input and output terminal mounted at the upper part of one side of the second housing, and a second external input and output terminal mounted at the lower part of the other side of the second housing, and the bus bars for external input and output terminal connection comprise a first bus bar connected to the electrode terminal of the battery cell located at the upper end of the battery cell stack so that the first bus bar can be connected to the first external input and output terminal, and a second bus bar connected to the electrode terminal of the battery cell located at the lower end of the battery cell stack so that the second bus bar can be connected to the second external input and output terminal.

10. The battery pack according to claim 9, wherein the second bus bar has a greater length than the first bus bar.

11. The battery pack according to claim 1, further comprising a sensing member which comprises sensors in mounted spaces defined at the front and rear of the second housing and a conduction part to connect the sensors to each other.

12. The battery pack according to claim 1, wherein a plurality of mounting grooves, into which the edges of the battery cells or the unit modules will be inserted, are formed at the inside of each of the first and second housings.

13. The battery pack according to claim 1, wherein each of the battery modules comprises a voltage sensing member and a temperature sensor for each of the battery modules.

14. The battery pack according to claim 13, wherein the voltage sensing members and the temperature sensor for each of the battery modules are connected to a battery management system (BMS) via a wiring harness.

15. The battery pack according to claim 14, wherein the battery pack is a power source for electric vehicles, hybrid electric vehicles or plug-in hybrid electric vehicles.

* * * * *